Dec. 20, 1960     J. F. McMAHON, JR     2,965,731
DRAFT CONTROL

Filed May 29, 1957     2 Sheets-Sheet 1

INVENTOR.
JAMES F. McMAHON JR.

Dec. 20, 1960  J. F. McMAHON, JR  2,965,731
DRAFT CONTROL
Filed May 29, 1957  2 Sheets-Sheet 2

INVENTOR.
JAMES F. McMAHON JR.
BY J. D. Douglas
His atty

United States Patent Office 2,965,731
Patented Dec. 20, 1960

2,965,731

DRAFT CONTROL

James F. McMahon, Jr., Shaker Heights, Ohio, assignor to Cleveland Fuel Equipment Company, Cleveland, Ohio, a corporation of Ohio Filed May 29, 1957, Ser. No. 662,510

11 Claims. (Cl. 200—83)

This invention relates to pressure responsive controls and more particularly to controls useful in controlling the conditions necessary to proper combustion in furnaces.

It is well known that for proper combustion of fuel in a furnace, certain optimum conditions should be maintained. Largely these include the proper fuel and air ratio for combustion in the furnace along with the proper draft control manipulation in the stack to rid the furnace of the products of combustion.

Usually these controls include, among other things, a device sensitive to pressure changes in the combustion chamber and which controls an activating means for opening and closing the stack damper. The function of the device is to maintain the required negative or positive draft over the entire range of the firing equipment operation, to maintain stable firing conditions and avoid losses due to improper fuel and air ratio, excess air and high stack temperatures. As implied above, it is common for this device to operate in conjunction with other apparatus.

The present invention is particularly useful in draft controls wherein a closed chamber is provided, such as is shown in Patent 2,658,122 to Richard Stein, which is connected by a duct into the combustion chamber. One wall of the chamber is provided with a movable diaphragm that has an operating rod carried thereby and which connects the diaphragm to a beam that operates one or more switches.

In a draft responsive device there would be a diaphragm that operated a switch or switches in a circuit where the diaphragm causes the switches to open or close a circuit upon a change in pressure which results in what may be termed a signal.

Since the damper operating mechanism is usually a motorized device, it is common to incorporate in the circuit to the motor a first switch for causing the motor to run in one direction and a second switch for causing it to operate in a reverse direction.

The pressure operated diaphragm may be spring loaded to determine or set the point at which a certain pressure change will operate the switch or switches, and, when the device is connected to a damper actuator, the amount of draft can then be determined.

That point of adjustment of the controller at which variations of pressure are to be sensed to provide a signal which will operate the controls is termed the "set point." As described, this is not actually a point but more properly a zone the width of which may be controlled. As will be apparent the two switches could be set so that a small movement of the diaphragm in either direction would cause one or the other switch to operate, or, so that it would take a larger movement to cause one switch or the other to operate.

It frequently happens that the place to which the pressure sensitive diaphragm is connected, such as the combustion chamber of a furnace, is subject to fluctuations due to changes in positive or negative pressure which renders the signal put out by the control unstable. When this type of signal is supplied to the damper control mechanism it causes its operation to be unstable, resulting in a decreased period of operation and may also cause what is known as hunting. The hunting in particular is undesirable because it does not allow the establishment of a definite given damper position for a given firing rate. Although this effect could, in a measure, be controlled by enlarging the range of the set point from the standpoint that where a damper is controlled, it would require a wider movement of the diaphragm to cause the damper to move one way or the other. The movement being due to the signals, this would result in a decrease in sensitiveness and also require a considerably greater amount of time to set up for a given installation.

By the present invention it is possible to eliminate these fluctuations within a wide range whether they be large or small.

Furthermore, by the use of this improvement, the control may be set close to the point of instability providing maximum possible sensitivity and effecting a high speed response without the hunting effect.

Briefly, the means contemplates an improvement whereby the fluctuations are filtered out. The excursions of the controller, which excursions are dependent largely on the character of operation, occur over a band which extends on either or both sides of the set point position for which the device is set. The amplitude of the excursions will vary with different installations. By the present invention the device may be adjusted to filter out these excursions. Furthermore, the device may be set to the proportion of the size of the fluctuations, hence the invention is termed an adjustable proportional band control.

Still other advantages of the invention as well as the invention itself will become more apparent from the following description of the invention, which description is illustrated by the accompanying drawings and forms a part of this specification.

Figures 1, 2, 3:
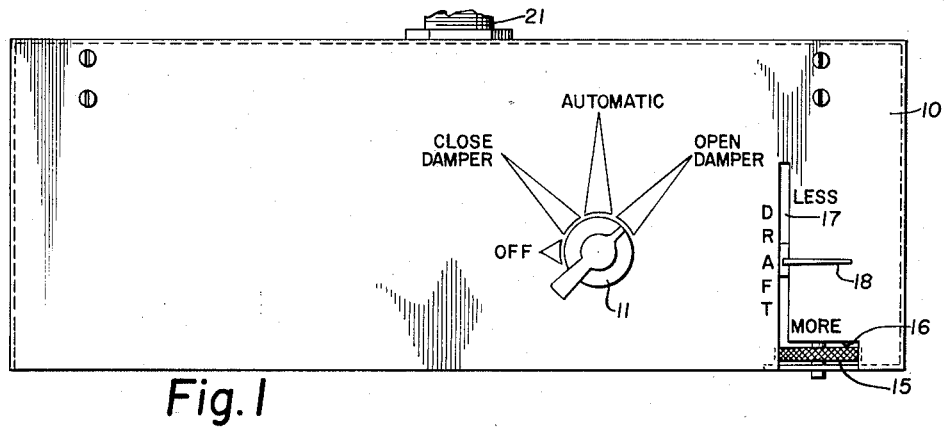
Fig. 1 is a front elevational view of the mechanism from the exterior.
Fig. 2 is a bottom plan view thereof with the housing removed.
Fig. 3 is a rear elevational view with certain parts broken away to more clearly show the construction.
Figure 5:
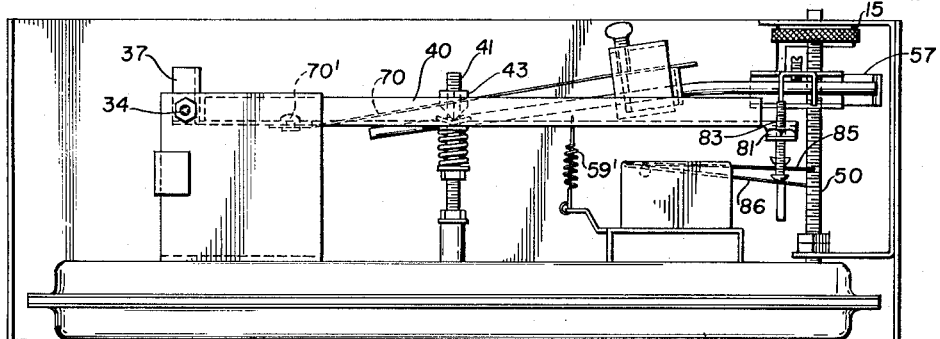
Figs. 4 and 5 are views similar to Figs. 2 and 3 of a modification thereof.

Referring now to the drawings throughout which like parts are designated by like reference characters, and more particularly to Fig. 1, the controller includes a base 10 which also comprises a face plate upon which is mounted a switch having a control knob 11. The switch is omitted from some of the remaining drawings in the interest of clarity. At the right lower side a knurled wheel 15 extends through a horizontal slot 16 in the lower edge of the panel. Extending upwardly from the slot 16 is a vertical slot 17 through which a pointer 18 projects and extends laterally. As will hereinafter more clearly appear the device is designed to adjust the amount of draft by rotation of the wheel 15, to which is connected a threaded shaft upon which is threaded a member which is moved vertically by rotation of the shaft. The vertically movable member carries the pointer which clearly indicates the direction in which the adjustment is being made, between the indicia "Less" at the top and "More" at the bottom.

Referring to Figs. 2 and 3, it will be seen that the panel supports a rectangular diaphragm housing which includes a fixed base portion 20 having a threaded coupling 21 which connects into the housing and which is adapted to be connected into a furnace combustion chamber by a suitable duct, not shown.

The base housing is provided with a peripheral flange 22 which is disposed opposite to a flange 23 on an inner housing 24. Engaged between the two flanges 23 and 24 is a flexible diaphragm 25 the edge of which is held in position between the two flanges which are secured together in clamping relation to the diaphragm in any suitable manner.

The diaphragm may have stiffening plates, as clearly shown in Patent 2,658,122, to the center of which a diaphragm stud or rod 27 is secured which extends outwardly freely through an opening 24' in the housing 24.

The housing 20 and the diaphragm, comprise a closed chamber having a movable wall (the diaphragm) which is sensitive to pressure variations within the chamber. The movement of the diaphragm transmits motion through the stud 27 to the remainder of the mechanism.

The inner housing 24 has a bracket, the base 30 of which is secured to its face in any suitable manner such as spot welding, and this bracket is provided with a pair of outwardly extending parallel arms 30a. These arms are provided with extended portions 30b which are offset to provide more widely spaced arms at the ends.

In this instance one of the walls 30a has secured thereto a switch 32 which may be of the so-called "micro" type, the operating pin 32a of which projects outwardly, parallel to the wall 30a. The offset portions 30b are provided with threaded apertures through which threaded pivot pins 34 are disposed projecting toward and in alignment with each other, the pins being provided with lock nuts 35 whereby their positions in the walls may be adjustably locked.

A beam member is pivotally supported by the pivot pins 34 and includes a beam base 36 the ends of which are provided with indentations 38 arranged to provide pivot pin receiving sockets for reception of the pointed ends of the pivot pins whereby the base is pivotally supported between the walls 30b.

A beam 40 extends from the base 36 to a position opposite the diaphragm stud 27, at that point it is provided with a laterally extending arm 40a which extends over the stud 27. The end of the arm 40a is deformed to provide a V-shaped seat 40b having an opening therethrough. The diaphragm stud 27 is provided with a threaded blind hole in which a threaded rod 41 is secured, being locked in position by a lock nut 42, and which rod extends through the opening in the seat 40b.

The stud 27 is connected to the arm 40 so that movement of the diaphragm moves the arm. This connection includes a knife edge nut 43 which is threaded on the rod 41 but has a diametrically extending sharp edge 44 which seats in the V-shaped seat 40b, being held against the arm by a keeper spring 45 and a nut 46 and washer 47, the nut being threaded on the rod 41.

This connection eliminates friction and permits the arm to tilt easily relative to the rod 41. A second "micro" switch is secured to the base 36 of the beam with the switch operating pin in contact with the switch operating pin of the other switch. The switches operate in the same manner as described in the Stein patent in that normally one of the switches requires greater operating pressure than the other, although that is not necessarily one of the parameters of the apparatus.

As best shown in Fig. 3, the set point adjustment wheel 15 is secured on a threaded rod 50, the ends of which are journalled in bracket arms 51 and 52 secured normal to the front wall. The rod is held in place with the wheel 15 against the upper bracket 51 by a pair of lock nuts 53 at the lower end of the rod which engage with the upper side of the lower bracket 52. In the drawings a slight gap is illustrated between the wheel and wall in the interest of clarity.

A slider bar support, which includes a base having spaced parallel walls 55 and 56 with aligned threaded openings, is threadedly disposed on the rod. A friction spring 57 secured to the base and extending laterally therefrom is disposed in slidable engagement with the inner front wall of the panel 10. The wall 55 of the support extends outwardly over the housing 24 and the end is shaped to provide a pair of spaced downwardly extending walls 55a provided with openings for the reception of a horizontally extending slider bar 58 which may be locked in any desired position by a set screw 59 which extends through the arm wall 55 between the walls 55a into engagement with the bar 58.

The slider bar 58 extends from the support with an angularly bent extension 58a, the end of which has connected thereto a helical tension spring 59a, the other end of which is connected to the end of the beam 40.

It will be apparent that the wheel enables the bar 58 to be adjusted and hence its position with respect to the beam. Since the position of the angular extension 58a may be adjusted by rotation of the bar 58 upon releasing the set screw 59, it will be apparent that the amount of tension exerted by the spring 59a may be adjusted to offset the effect of the weight of the beam. Hence the spring is termed a zero bias spring.

The set point is determined by the vertical position of the slider bar support which is connected to the beam by a leaf spring. To this end a slidable adjuster is provided on the slider bar which connects with a spring carried by the beam 40.

The adjuster includes a U-shaped base providing a pair of spaced parallel walls 60 having aligned apertures for slidably mounting it on the bar 58. It will be appreciated that this could be a solid block if desired but preferably is a metal stamping in the interest of weight reduction and economy. The base is provided with an arm 62 which extends upwardly and then over the base at 62a and then downwardly at 62b, the portion 62a being provided with a threaded aperture for the reception of an adjusting screw 63.

A Phosphor bronze flat spring 70 is secured to the arm 40a of the beam by a bolt 71 and extends outwardly from the beam over the upper edges of the arm 60 on the base under the part 62a. This spring thus extends in spaced relation to the slider bar and can be clamped to the bar by the adjuster at various points spaced from the point of connection of the spring to the beam arm 40a. Thus, the effective length of the spring may be varied depending upon the selected position of the adjuster.

It will thus be seen that the set point of the device may be adjusted by turning the wheel 15 which moves the slider bar support 55 and with it the slider bar 58. This movement is transmitted through the spring 70 to the beam. The set point having been set, subsequent movement of the diaphragm, which is transmitted to the beam and which results in operation of either of the switches, is resisted by the stiffness of the spring 70. Assuming that a desired amount of draft has been attained and it is desired to maintain that degree of pressure determined by the amount of draft, it will be appreciated that the position of the diaphragm and its connection to the beam as well as the position of the spring are all at a balanced position wherein the switches are sending out no signal. Should the pressure vary in either direction, the diaphragm under these conditions will move relatively easy depending upon the position of the adjuster in relation to the spring 70. The ease of movement is determined by the degree of fluctuations which may be said to be anomalies. If these fluctuations in a certain installation are of a low order, the adjuster is set a greater distance away from the beam arm lessening the resultant stiffness. If the fluctuations are of a higher order, the adjuster may be moved closer to the beam increasing the resultant stiffness and filter out the anomalies.

Thus the range of movement beyond the set point may be controlled, the controlling thereof being termed a proportional band adjustment. As the effective length of the spring is decreased, the proportional band becomes greater. As the length is increased, it becomes narrower.

Figure 4:
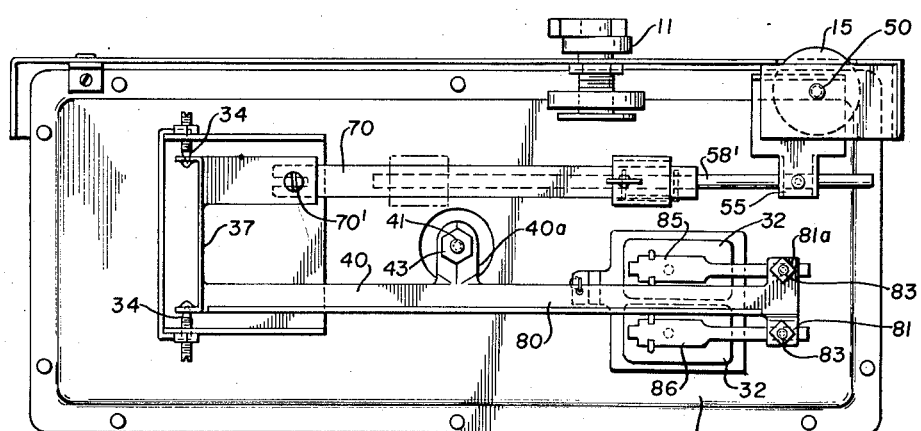

Although the invention has been described as being particularly useful in structures such as illustrated in Figs. 2 and 3, the invention may also be incorporated in a structure such as shown in Fig. 4, where the switches are not disposed in opposition to each other.

The device is similar in construction and includes the beam which comprises a base 37 supported between the pivots 34 and having a beam 40 with an arm 40a connected to the diaphragm rod 41 by the knife nut 43. In this instance, the beam arm extends beyond the point of connection to the diaphragm at 80 over a pair of parallel positioned "micro" switches 32. The end of the arms is provided with lateral extensions 81 which provides threaded holders for adjusting screws 83.

The "micro" switches are each provided with hinged operating levers 85 and 86 which are positioned to engage the operating pins of the switches when the levers are depressed. The lever 85 extends under and is engaged by the lateral extension 81a and the lever 86 extends under lateral extension 81 where it is engaged by the end of the adjusting screw 83. The end of the beam may take other shapes than that illustrated.

The sequence of operation of the switches can be determined by the position of the adjusting screws 83. It is also apparent that the beam could directly contact one of the switches and only one adjustment screw provided for the other switch.

The spring 70 in this instance is secured to the base 37 by a screw 70' and extends in parallel relation to the beam arm 40. The slider bar support 55 is carried by a rod 50 and in turn carries a slider bar 58' in the same manner as previously described.

In this particular instance, however, the bar merely extends under the spring 70 and its only connection to the spring is through the adjuster as described although a spring 59' similar to the spring 59 may be used if desired.

In operation the determination of the set point and proportional band is as previously described. When the diaphragm in this instance rocks the beam arm the extension of the arm causes the operation of the switches, the sequence of operation being determined by the direction of movement of the beam arm and the adjustment of the screw 83.

Having thus described the invention in some embodiments thereof, I am aware that numerous and extensive departures may be made therefrom without departing from the spirit of the invention as defined by the appended claims.

I claim:

1. An apparatus for sending a signal in response to fluctuations in fluid pressure wherein a pressure responsive member is connected to a signal controlling arm which comprises a seat formed in the arm and having an opening therethrough, a threaded rod connected to said pressure responsive member and extending through the opening, a member threaded on the rod and having a portion for engagement in the seat and means to hold said member on the seat comprising resilient pressure means carried by the rod and engaging the arm opposite to the seat.

2. An apparatus as described in claim 1, wherein the seat comprises a depression extending diametrically thereacross.

3. An apparatus as described in claim 2, wherein seat engaging member is provided with a knife edge for engagement in the depression.

4. An apparatus for sending a signal in response to variations in fluid pressure wherein a pressure responsive member is connected to a lever arm which lever arm is engaged with signal sending means, means for setting said lever and said pressure responsive means for causing signals to be sent in the presence of variations in a predetermined pressure applied to the pressure sensitive means comprising a support, means for adjustably moving said support to predetermined positions, a beam carried by said support and extending toward said lever and arranged to be adjusted by moving its support to move the beam in a direction corresponding to the movement of the lever and pressure responsive means, and means connecting said beam to said lever.

5. An apparatus as described in claim 4, wherein said connecting means comprises a flat leaf spring secured to the end of the lever and extending alongside the beam.

6. An apparatus as described in claim 5, wherein said beam is connected to the spring by clamping means movable longitudinally of the spring and beam to adjust the effective length of the spring.

7. An apparatus for sending a signal in response to fluctuations in fluid pressure about a mean pressure, wherein a pressure responsive diaphragm is pivotally connected to a lever and the lever is operably connected to the signal sending means comprising means for setting the lever and its pressure responsive means to send signals responsive to variations about a predetermined mean value of pressure including an adjustment screw, a support carried by the screw and movable in response to rotations of the screw, a rod carried by the support and movable therewith extending toward and connected to the end of the lever, said rod being provided with an angular extension, said rod being arranged to be adjustably rotated in said support and spring means on the angular extension connecting the rod to the lever for exerting pressure on the lever in a predetermined direction.

8. An apparatus as described in claim 7, wherein the slidable clamp is slidably mounted on the rod and a spring loading is carried by the lever and connected to said slidable clamp.

9. An apparatus as described in claim 8, wherein a loading spring extends alongside the rod and the clamp is arranged to be moved longitudinally relative to the rod and spring to adjust the spring rate.

10. An apparatus for sending a signal in response to pressure variations wherein a pressure responsive means is connected to and operates a lever arm connected to signal sending means, means for adjusting said lever arm to send signals in response to predetermined variations in pressure comprising a member connected to the lever arm, and member mounting means for adjustably moving said member in the direction of movement of the arm and means connecting said member to the arm, said connecting means between said member and the arm comprising a spring formed of a flat strip of metal extending along said member.

11. A device as described in claim 10 wherein said spring is connected to said member by a slider carried on the member and the slider is arranged for longitudinal movement on the member to increase or decrease the effective length of the spring.

References Cited in the file of this patent

UNITED STATES PATENTS

| | | |
|---|---|---|
| 1,911,530 | Raisch et al. | May 30, 1933 |
| 2,203,523 | Cunningham | June 4, 1940 |
| 2,281,544 | Beeman et al. | May 5, 1942 |
| 2,281,764 | Hanke | May 5, 1942 |
| 2,283,374 | Kronmiller | May 19, 1942 |
| 2,390,145 | Graves | Dec. 4, 1945 |
| 2,454,423 | Baak | Nov. 23, 1948 |
| 2,475,069 | Wood | July 5, 1949 |
| 2,620,413 | Johnson | Dec. 2, 1952 |
| 2,720,564 | Soring et al. | Oct. 11, 1955 |
| 2,814,689 | Roche | Nov. 26, 1957 |

UNITED STATES PATENT OFFICE
CERTIFICATION OF CORRECTION

Patent No. 2,965,731                          December 20, 1960

James F. McMahon, Jr.

It is hereby certified that error appears in the above numbered patent requiring correction and that the said Letters Patent should read as corrected below.

Column 6, line 35, for "spring loading" read -- loading spring --.

Signed and sealed this 23rd day of May 1961.

(SEAL)
Attest:

ERNEST W. SWIDER                          DAVID L. LADD
Attesting Officer                              Commissioner of Patents